March 17, 1970  A. M. ELIAS  3,500,818
FLASH STEAMER FOR MOISTENING AND HEATING FOOD PRODUCTS
Filed Feb. 17, 1969  5 Sheets-Sheet 1

FIG. 1

INVENTOR.
ALBERT M. ELIAS

BY
Donnelly, Mentag & Harrington

ATTORNEYS

INVENTOR.
ALBERT M. ELIAS
BY
Donnelly, Mentag & Harrington
ATTORNEYS

United States Patent Office 3,500,818
Patented Mar. 17, 1970

3,500,818
FLASH STEAMER FOR MOISTENING AND
HEATING FOOD PRODUCTS
Albert M. Elias, 13027 Frankfurt,
Detroit, Mich. 48213
Filed Feb. 17, 1969, Ser. No. 799,581
Int. Cl. A47j 27/06
U.S. Cl. 126—369   15 Claims

ABSTRACT OF THE DISCLOSURE

A flash steamer apparatus for use in steaming foods such as buns, bread, cake and the like, for the purpose of freshening the same and which includes a cabinet having a food compartment, a lower steam generating chest disposed below the food compartment, an upper heated steam chest disposed in a cover hingedly mounted over the food compartment, the upper steam chest is provided with a tapered steam receiving chamber so as to distribute the steam entering the chamber evenly through a plurality of discharge ports into the food compartment with a minimum loss of pressure, passage means for conveying steam generated in the lower steam generating chest to the upper steam chest including passageways formed through the hinge means for hinging the cover on the cabinet, and a rotary flow control valve and metering valve adapted to be connected to a water supply source for controlling the injection of metered amounts of water into the lower steam generating chest to convert the water into steam, and wherein the steam passes upwardly into the upper steam chest chamber and is discharged downwardly into heating engagement with food disposed in the food compartment.

BACKGROUND OF THE INVENTION

Field of the invention

This invention relates generally to the flash steamer art, and more particularly to a flash steamer adapted for warming foods, freshening foods, and for other like steaming operations.

Description of the prior art

Flash steaming apparatuses for use in steaming foods such as buns, bread, and the like, are well known in the art. One example of the prior art is disclosed in my prior U.S. Patent No. 2,719,211 which shows a food steamer having a cabinet carrying a lower steam generating chest and a food compartment, a cover hinged on the cabinet and carrying an upper steam chest for receiving steam from the lower steam generating chest and for discharging the steam downwardly into the food compartment, a passage means for conveying steam from the lower steam chest into the upper steam chest, including a passage through the cover hinge means, and a flow control valve for admitting a predetermined amount of water into the lower steam generating chest. Other examples of the prior art shown in the U.S. Patents Nos. 2,181,434, 2,186,-932, 2,674,935, 2,636,969, 2,973,705 and 3,069,994.

The prior art food steamers have certain disadvantages including the problem of injecting an accurate predetermined amount of water into a steam generating means. Another problem of the prior art devices is that it has not been possible to efficiently generate steam in a lower chamber and convey it to an overhead position over the food in a food container without condensation, leakage, and loss of heat, and with the ability to disperse the steam evenly throughout the food compartment. The prior art devices also had problems with calcification building up on the operating parts of the flow control valves and with heat destroying valve seals. A further problem of the prior art devices is that they have not been able to efficiently convey steam from a lower steam generating chest into an upper steam discharging chest in a hingedly mounted cabinet cover.

SUMMARY OF THE INVENTION

The present invention relates generally to flash steamers for steaming foods such as buns, breads, and the like.

It is an important object of the present invention to provide a food steamer which is adapted to overcome the aforementioned disadvantages of the prior art food steamers.

It is another object of the present invention to provide a food steamer having a food compartment and a hingedly mounted cover carrying a steam receiving and discharging chamber for discharging steam downwardly into engagement with food in the food compartment, and wherein the steam receiving and discharging compartment is constructed and arranged with a converging or tapered cross section, with a reduced volume in the front end thereof and a large volume at the rear end thereof where steam is received from a separate steam generating chamber.

It is a further object of the present invention to provide a food steamer incorporating a cabinet having a cover hinged thereon, and a novel and improved steam passage means formed through a hinge means for mounting the cover on the cabinet, whereby steam may be generated in a lower steam generating chamber in the cabinet and be conveyed with efficiency and without leakage or condensation upwardly through the cover hinge means into an upper steam receiving and discharging chamber.

It is still another object of the present invention to provide a food steamer incorporating a novel and improved water flow control valve and a water metering valve for efficiently injecting a predetermined amount of water into a steam generating means.

It is still another object of the present invention to provide a food steamer which includes a cabinet in which is operatively mounted a food compartment, an upper steam chamber for receiving steam and discharging steam downwardly into the food compartment, said upper steam chamber being provided with an internal shape which is tapered in cross section so as to converge forwardly from the rear end thereof, a lower steam generating chest in the cabinet below the food compartment adapted for heating the food compartment and for forming steam from a predetermined amount of water injected therein, and a flow control valve and metering valve operatively connected to the lower steam generating chest and to a water supply source for injecting a predetermined amount of water into the lower steam generating chest.

Other objects, features and advantages of this invention will be apparent from the following detailed description, appended claims, and the accompanying drawings.

BRIEF DESCRIPTION OF THE DRAWINGS

FIG. 4 is a top plan view of the structure illustrated 3,500,818

3 in FIG. 3, taken along the line 4—4 thereof, with parts removed, and looking in the direction of the arrows.

DESCRIPTION OF THE PREFERRED EMBODIMENT

Figure 1:
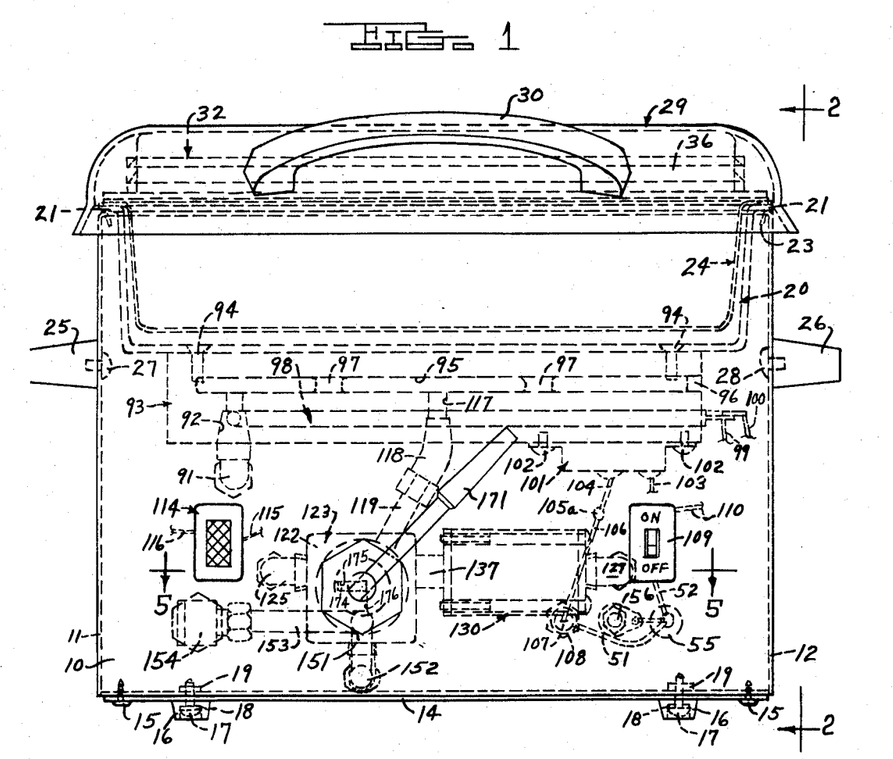
FIG. 1 is a front elevational view of a food steamer made in accordance with the principles of the present invention.
Figure 2:
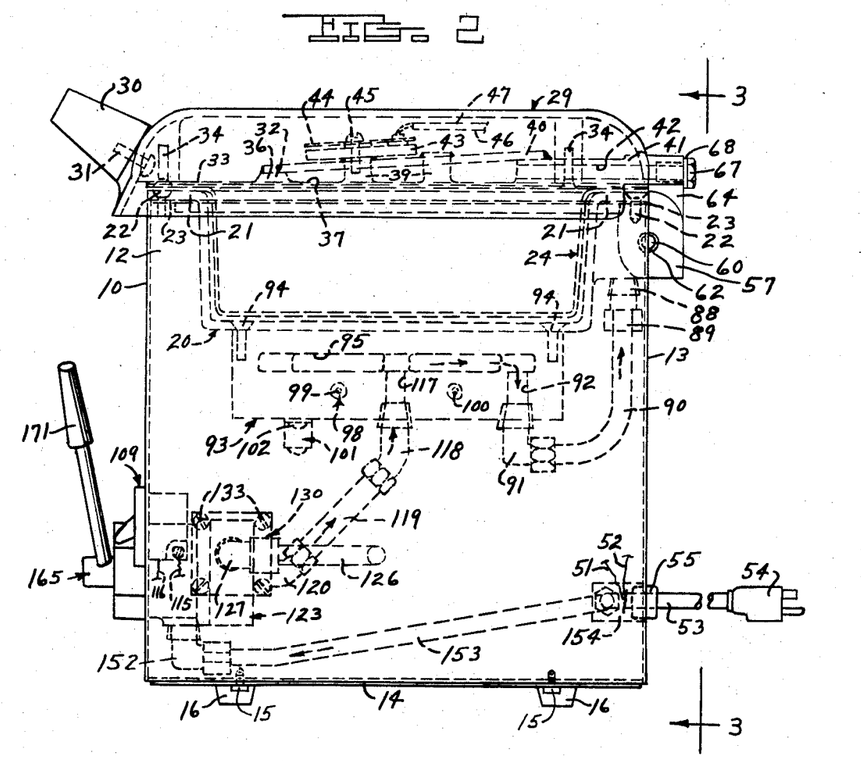
FIG. 2 is a right side elevational view of the food steamer illustrated in FIG. 1, taken along the line 2—2 thereof, and looking in the direction of the arrows.
Figure 3:
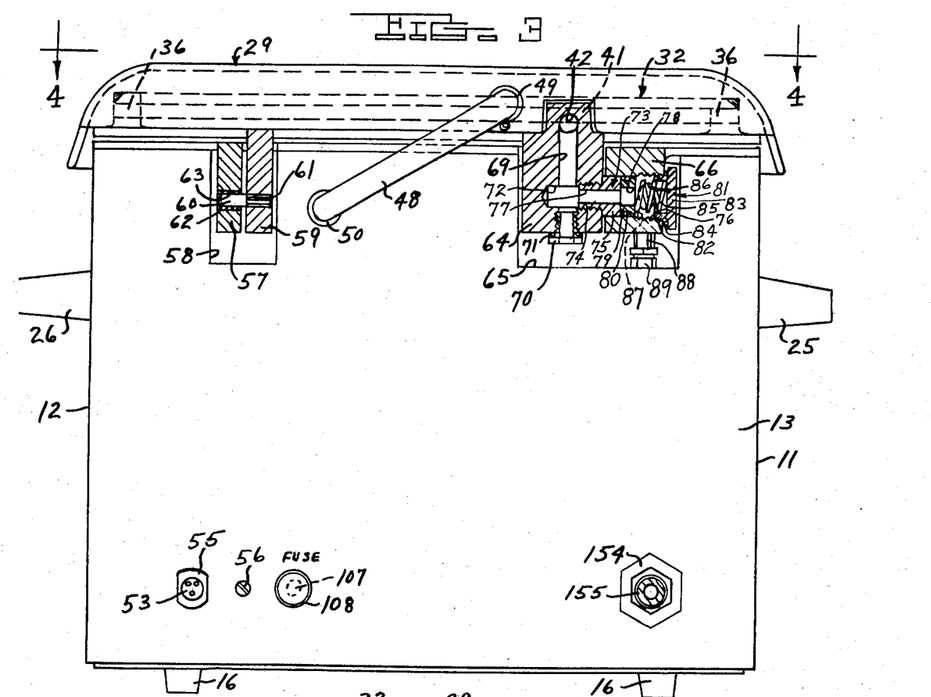
FIG. 3 is a rear elevational view of the food steamer shown in FIG. 2, taken along the line 3—3 thereof, and looking in the direction of the arrows.

Referring now to the drawings, and in particular to FIGS. 1 and 3, an illustrative embodiment is shown therein which comprises a cabinet or housing having a front side wall 10, a left side wall 11, a right side wall 12, and a rear side wall 13 (FIG. 3). The cabinet walls 10 through 13 may be made from any suitable materials, as for example, aluminum or stainless steel. The cabinet walls 10 through 13 are fixedly secured to a bottom wall or base plate 14 by any suitable means, as by a plurality of self-threading screws 15 (FIGS. 1 and 2) which are threaded through suitable flanges formed along the bottom end of the side walls. The cabinet is provided with a plurality of suitable supporting rubber pads or feet 16 which are adapted to be suitably secured to the bottom plate 14 by any suitable means, as by the screws 17 (FIG. 1), the washers 18 and the nuts 19.

As shown in FIGS. 1 and 2, the cabinet is provided with a food well 20 which may be made from any suitable material, as for example, aluminum. The well 20 is provided with peripheral flanges as 21 (FIG. 2) around the upper edges thereof which are adapted to be seated on the flanges 23 formed on the upper ends of the cabinet walls and to be secured to flat portions of said flanges by any suitable means, as by screws 22 (FIG. 2). A food container 24 is removably seated in the well 20. The food container 24 is preferably formed as a stainless steel tray or pan with peripheral flanges around the upper end thereof for seating on the well flanges 21 to support the tray in the well 20. It will be seen that the removable food tray 24 is adapted to support food, as buns or the like, above the bottom wall of the well 20.

Figure 4:
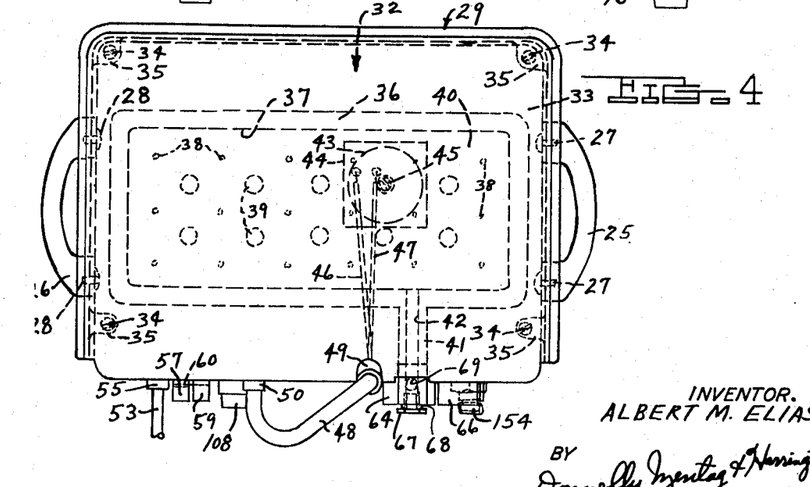

As shown in FIGS. 1 and 4, the cabinet body is provided with a pair of handles 25 and 26, on the left and right side walls thereof, respectively. The handles 25 and 26 may be made from any suitable material and they are secured to the side walls 11 and 12 by any suitable means, as by the screws 27 and 28, respectively.

The upper end of the food steamer cabinet is enclosed by a hingedly mounted cover (FIGS. 1-4), generally indicated by the numeral 29. The cover 29 is made from any suitable material, as for example, aluminum. The cover 29 is adapted to enclose the upper end of the cabinet, and it is hollow and open on the lower side thereof. The cover 29 is provided with a suitable handle 30 on the front side thereof which is secured to the cover by any suitable means, as by the screws 31 (FIG. 2).

As best seen in FIG. 2, the cover 29 is adapted to carry an upper steam receiving and discharge chest, generally indicated by the numeral 32 which is disposed over the food compartment or container 24 when the cover 29 is in the closed position. The upper steam chest 32 includes the upper heater 33 which is made from any suitable, as for example, cast aluminum. As best seen in FIG. 4, the upper heater plate 33 is releasably secured

4 by a plurality of screws 34 to the integral projections or flanges 35 which are formed on the cover 29. As best seen in FIGS. 2 and 4, the upper heater plate 33 is provided on the upper or outer face thereof with an integral raised wall 36 which is rectangularly shaped and forms a steam chamber 37.

As shown in FIG. 2, a plurality of downwardly directed discharge ports or orifices 38 are formed through the upper heater plate 33 within the steam chamber 37 for delivering steam into the food container 24 in an evenly distributed manner. The steam chamber 37 is enclosed by a cover plate 40 which is made from the same material as the upper heater plate 33 and secured thereto by any suitable means, as by welding. The cover plate 40 is further supported and welded to a plurality of integral, upwardly extended cylindrical projections 39 which extend through suitable holes in the plate 40. As shown in FIG. 4, the upper steam chest 32 further includes a raised, rearwardly extended projection 41 on the rear end of the upper heater plate 33. Formed through the projection 41 is a bore 42 which forms a steam passage for admitting steam into the steam chest 37. As illustrated in FIG. 2, the steam chest cover plate 40 slopes downwardly and forwardly, toward the front of the steam chest, so as to converge with the plate 33 from the back end toward the front end thereof. The converging steam chest 37 provides for an even distribution of the steam downwardly through the discharge ports 38, since the steam chest has a large volume at the rear end thereof, where the steam is admitted through the passage 42, and a progressively smaller volume proceeding toward the front end thereof. Since some of the steam is discharged through the discharge ports 38 along the rear end of the steam chamber 37 during the initial stages of the discharge of the steam down into the food compartment 24, the decreasing volume of the steam chamber 37 proceeding toward the front end thereof functions to maintain a substantially constant discharge pressure through all of the ports 38 to give a substantially even distribution of the steam downwardly on the food in the food container 24. The ports 38 may be of any suitable size, as for example, .040" diameter. The steam receiving and discharging chamber 37 may also be described as being tapered in cross section, with the larger end disposed toward the rear of the cover 29 and the smaller end disposed toward the front end of the cover 29. The steam in the chamber 37 is discharged through the ports 38 in an even manner and with a minimum loss pressure which effects an even distribution throughout the food container 24 and causes a penetration of the hard crusts of food in the container 24. The even distribution of the steam over the food products provides for a penetration of the steam into the foods, such as bread or buns, and results in an addition of moisture as well as heat to impart freshness to the foods.

As shown in FIGS. 2 and 4, the upper steam chest 32 is provided with a suitable upper heater element 43 which is of a suitable heating capacity, as for example, a 200 watt, 115 volt electric heater element. A heat deflector plate 44 is mounted over the heater element. 43. The heater element 43 and the heat deflector plate 44 are secured to one of the posts 39 by a screw 45. The heater element 43 is connected by suitable leads or wires 46 and 47 to the power source leads 51 and 52 shown in FIG. 2. As shown in FIG. 4, the leads 46 and 47 are adapted to pass out of the rear end of the cover 29 through a suitable protective hose or tubing 48 and into the inside of the cabinet where they are operatively connected to the leads 51 and 52, as illustrated in the wiring diagram of FIG. 8. The wiring diagram of FIG. 8 will be described in detail hereinafter.

As shown in FIG. 2, the leads 51 and 52 pass out through the cabinet back wall 13 and form part of the servicing cord 53 which is provided with a suitable conventional male plug 54 for connecting the food steamer to a suitable source of electrical power, as for example, a 115 volt A.C. power source. The protective tubing 48 is operatively connected to the cover 29 by a suitable clamp 49 and to the cabinet by a similar clamp 50. As shown in FIG. 3, the servicing cord 53 extends through a suitable protective fitting 55 mounted in the cabinet back wall 13. The cord 53 is grounded to a screw 56 (FIG. 3) mounted in the cabinet back wall 13.

As shown in FIGS. 2 and 3, the cover 29 is hingedly mounted by a pair of hinges constructed in the following described manner. The right rear end of the cover 29 is provided with a right hinge means which includes a first boss or hinge member 57 that is integrally formed on the rear side of the well 20 and which extends rearwardly outward through an opening 58 in the cabinet rear wall 13. A second boss or hinge member 59 is integrally formed on the upper heater plate 33 and it also extends outwardly through the wall opening 58, and it is disposed in an adjacent side-by-side position (FIG. 3) with the first hinge member 57. The hinge members 57 and 59 are hingedly connected by a hinge pin 60 which has a knurled end pressed into a horizontal bore 61 in the hinge member 59. The other end of the hinge pin 60 is rotatably mounted in a suitable bronze sleeve bushing 62 which is operatively mounted in a horizontal bore 63 in the first hinge member 57.

As shown in FIG. 3, the left rear end of the cover 29 is provided with a left hinge means which includes a first boss or hinge member 64 that is integrally formed on the rear side of the well 20 and which extends rearwardly outward through an opening 65 in the rear wall 13. A second boss or hinge member 66 is integrally formed on the upper heater plate 33 in alignment with the projection 41. The second boss or hinge member 66 also extends outwardly through the opening 65 and it is disposed in an adjacent side-by-side position with the first hinge member 64. The hinge members 64 and 66 are hingedly connected by the following described structure which also comprises a part of the steam flow passage for the steam passing into the upper steam chamber 37.

As shown in FIGS. 2 and 4, the outer end of the steam passage or bore 42 is enclosed by an suitable means, as for example, the threaded brass plug 67 and the copper gasket 68. As shown in FIGS. 2 and 4, the hinge member 64 is provided with a vertical bore 69 which extends upwardly into the integral projection 41 and into communication with the horizontal steam bore 42. As shown in FIG. 3, the lower end of the bore 69 is enclosed by a suitable threaded brass plug 70 and copper gasket 71.

As shown in FIG. 3, the hinge member 64 is provided with a horizontal bore 72 which extends inwardly from the side adjacent the hinge member 66. The bore 72 extends inwardly into communication with the vertical bore 69. The hinge members 64 and 66 are hingedly connected by a hinge pin generally designated by the numeral 73. The hinge pin 73 has one end 74 threadably mounted in the outer end of the bore 72. The hinge pin 73 has an enlarged outer end 75 which is formed with an annular bearing surface that is slidably and rotatably mounted in the inner end of a horizontal bore 76 formed through the hinge member 66. The hinge pin 73 is provided with an axial bore 77 which extends completely through the pin 73 and communicates the bore 69 with a bore 78 formed axially through a cylindrical face-type seal member 79 which is made from any suitable material, as for example, sintered carbon. The seal member 79 is provided with a suitable, circumferential O-ring seal member 80. The seal member 79 is retained in sealing engagement against the outer end of the hinge pin 73 by a spring 85 and a suitable hinge seal retainer member generally indicated by the numeral 81. As shown in FIG. 3, the hinge seal retainer 81 includes a cylindrical threaded body 82 and an integral head member 83. A copper gasket 84 is mounted around the retainer body 82, between the outer side of the hinge member 66 and the retainer head 83.

As shown in FIG. 3, the retainer body 82 of the retainer 81 is provided with a cylindrical chamber in which is mounted the hinge seal spring 85. The spring 85 has its outer end seated against the seal member 79 for biasing it against the outer end of the hinge pin 73 to maintain a sealing contact therewith when the hinge pin 73 is rotated. A hole 86 is formed through the side of the horizontal bore 76 and it communicates with a vertical bore 87 which is formed through the hinge member 66. The bore 87 is open at the lower end thereof. Threadably mounted in the lower end of the bore 87 is a pipe 88 which has fixed to the lower end thereof a suitable coupling 89 for connecting the pipe 88 to one end of a tubing 90. As shown in FIG. 2, the tubing 90 extends downwardly and has the other end thereof connected by a suitable elbow fitting 91 to the outer end of a steam bore or passage 92 formed in the lower steam chest 93. The lower steam chest 93 generates steam and delivers it to the tube 90 for passage upwardly through the bores 87, 86, 78, 77, 72, 69 and 42, and thence into the upper steam chamber 37. The seal 79 seals on its inner side face which is forced against the outer end of the hinge pin 73 to provide a watertight seal. The seal 79 is made from a plastic impregnated graphite material, and since the sealing is not done on the periphery of the seal, a slight misalignment of the parts of the hinge will not cause any steam leakage. The peripheral O-ring seal 80 seals the seal member 79 around the periphery thereof. The aforedescribed hinge means is not subject to steam leakage and it is not subject to damage by calcification or deposits from the steam flowing therethrough.

As shown in FIGS. 1 and 2, the lower steam chest 93 is secured by a plurality of screws 94 to the lower side of the well 20. The lower steam chest 93 may be made from any suitable material, as for example, it may be cast in a single piece from aluminum. The steam chest 93 is provided with a horizontally disposed lower steam chamber 95 which as an opening at one end that is enclosed by a welded plug 96 (FIG. 1). The steam chamber 95 is rectangularly shaped in horizontal plan and it is provided with a plurality of vertically extended posts which are similar to the posts 39 in the upper rectangular steam chamber 37. The steam passage or bore 92 communicates with the steam chamber 95 at the right rear end corner thereof. The lower steam chest 93 is provided with a lower heater element 98 which is U-shaped in horizontal plan configuration, and which is cast in place in the lower steam chest 93. A similar heating element is shown in my aforementioned prior Patent No. 2,719,211, in FIG. 5 thereof. As shown in FIG. 1, the two ends of the legs of the U-shaped heater element 98 are connected to suitable leads 99 and 100 for connection to the power source leads 51 and 52 as shown in detail in FIG. 8. The lower heater element 98 may be of any suitable type, as for example, a 1300-watt, 115 volt A.C. heater element.

Figure 8:
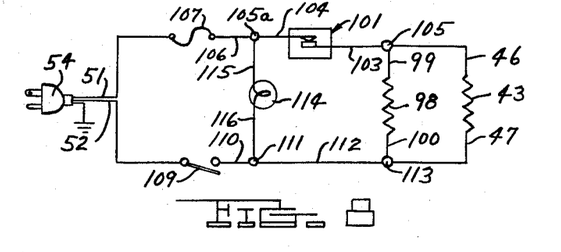
FIG. 8 is a diagrammatic view of the electric wiring circuit used in the invention.

As shown in FIGS. 1 and 2, a suitable thermostat 101 is attached to the bottom side of the lower steam generating chest 93 by the screws 102. As shown in FIG. 1, one terminal of the thermostat 101 is provided with a lead 103. The other terminal is provided with a lead 104. As shown in FIG. 8, the thermostat lead 103 is connected to the upper heater lead 46 and the lower heater lead 99 at the junction 105. The other thermostat lead 104 is connected to a junction 105a to which is connected by a lead 106 one end of a fuse 107. The fuse 107 may be any suitable fuse, as for example, a 20 amp fuse. As shown in FIGS. 1 and 3, the fuse 107 is mounted in a suitable fuse holder 108 that is supported in the cabinet back wall 13.

As shown in FIGS. 1 and 8, the service cord lead 52 is connected to one terminal of an "on-off" power switch 109. The other terminal of the switch 109 is connected by the lead 110 to a junction 111 (FIG. 8). As shown in FIG. 8, the junction 111 is connected by the lead 112 to a junction 113. The upper heater lead 47 and the lower heater lead 100 are connected to the junction 113. As shown in FIGS. 1 and 8, a pilot or signal light 114 is provided to show that the electrical system is energized. One terminal of the pilot light 114 is connected by the lead 115 to the junction 105a (FIG. 8). The other terminal of the pilot light 114 is connected by the lead 116 to the junction 111.

Figures 5, 6, 7, 10:
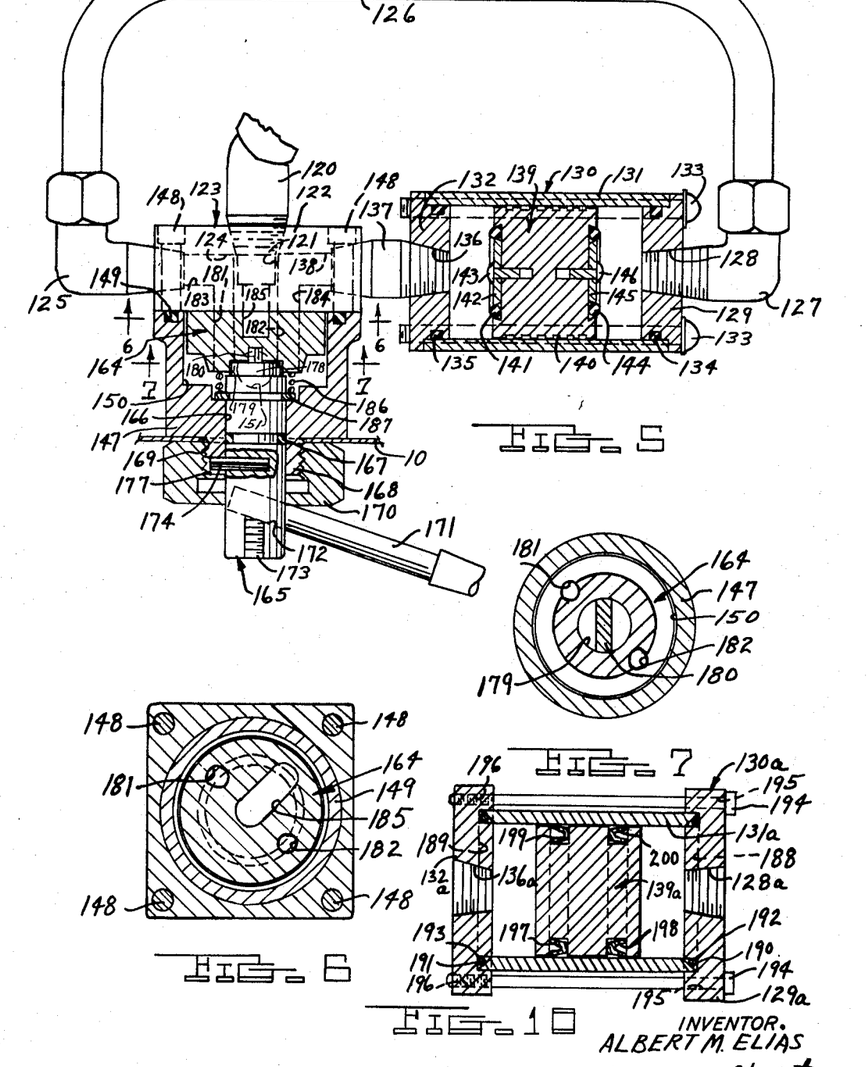
FIG. 5 is a fragmentary, enlarged, horizontal section view of the food steamer structure illustrated in FIG. 1, taken along the line 5—5 thereof, and looking in the direction of the arrows.
FIG. 6 is an elevation view of the structure illustrated in FIG. 5, taken along the line 6—6 thereof, and looking in the direction of the arrows.
FIG. 7 is an elevational section view of the structure illustrated in FIG. 5, taken along the line 7—7 thereof, and looking in the direction of the arrows.
FIG. 10 is an elevational section view of a modified metering valve employed in the invention.

As shown in FIGS. 1 and 2, a water inlet bore or passage 117 is formed through the bottom of the lower steam chest 93 in a central position and it communicates with the steam chamber 95 for admitting water under controlled pressure for generating a charge of steam. Threadably mounted in the lower end of the passage 117 is an elbow fitting 118 to which is operatively connected one end of a copper tube 119. The other end of the copper tube 119 is operatively connected to an elbow fitting 120. The elbow fittings 118 and 120 may be made from any suitable material, as for example, bronze. As best seen in FIG. 5, the elbow fitting 120 is preferably mounted in the rear end of a stepped passage or bore 121 which is formed through a valve cover 122 of a manually operated, four-way, rotary flow control valve generally indicated by the numeral 123. The four-way valve 123 may also be electrically or hydraulically operated.

The rotary valve 123 is adapted to feed a metered or predetermined amount of water from a low pressure water supply system to the lower steam chest 93, as more fully described hereinafter. As shown in FIG. 5, the valve cover 122 is provided with a first passage 124 in which is threadably mounted a brass elbow tube fitting 125 which is connected to one end of a copper tube 126. A second brass elbow fitting 127 is connetced to the other end of of the copper tube 126. The elbow 127 is threadably mounted in a threaded hole 128 formed axially through the round end plate 129 of a metering valve generally indicated by the numeral 130.

The metering valve 130 includes a cylindrical valve body 131 which is made from brass tubing. The end plate 129 is connected to one end of the body 131 and a second round end plate 132 is connected to the other end of the body 131. The end plates 129 and 132 are secured to the valve body 131 by any suitable means, as by a plurality of elongated screws 133. The end plates 129 and 132 are provided with peripheral O-ring seals 134 and 135, respectively. The end plate 132 is provided with a threaded axial hole 136 in which is threadably mounted one end of a pipe nipple 137. The other end of the nipple 137 is threadably mounted in the outer end of a second passage 138 formed in the valve cover 122, in a position diametrically opposite to the passage 124.

The metering valve 130 further includes a brass valve piston 139 which is provided with a plurality of peripheral grooves 140 that function to clean deposits from the wall of the valve body 131. One end face of the valve piston 139 is provided with a circular O-ring seal 141 which is held in place by a retainer washer 142 and a drive pin 143. The other end face of the valve piston 139 also carries an O-ring seal 144 which is held in place by a retainer washer 145 and a drive pin 146. The end face seals 141 and 144 seal against the end faces of the end plates 129 and 132 and provide long, useful and trouble-free valve life. As will be further described hereinafter, the four-way valve 123 is adapted to direct water from a regulated supply in an alternate manner into the opposite ends of the metering valve 130 so that with each operation of the valve 123 a metered charge of water is forced into the elbow 120. The admission of water under pressure into one end of the metering valve 130 moves the piston 139 to evacuate a metered amount of water from the other end of the valve which was admitted to the valve 130 during the previous operation.

As shown in FIG. 5, the valve 123 further includes a cylindrical valve body 147 which has a square flange for mounting the valve body on the square-shaped valve cover 122. The valve body 147 is releasably secured to the valve cover 122 by a plurality of socket head screws 148. A suitable O-ring seal 149 is mounted between the valve body 147 and the valve cover 122. A cylindrical valve chamber 150 is formed in the inner end of the valve body 147 and it communicates with a water inlet passage 151 which is formed on the lower side of the valve body 147. As shown in FIG. 2, a brass elbow fitting 152 is threadably mounted in the inlet passage 151 and it is also connected to a copper tube 153 (FIG. 1). As seen in FIGS. 1 and 2, the copper tube 153 extends rearwardly and then to the left rear corner of the cabinet to a point where it is connected to an elbow 154 that is fixed in the cabinet back wall 13.

Figure 9:
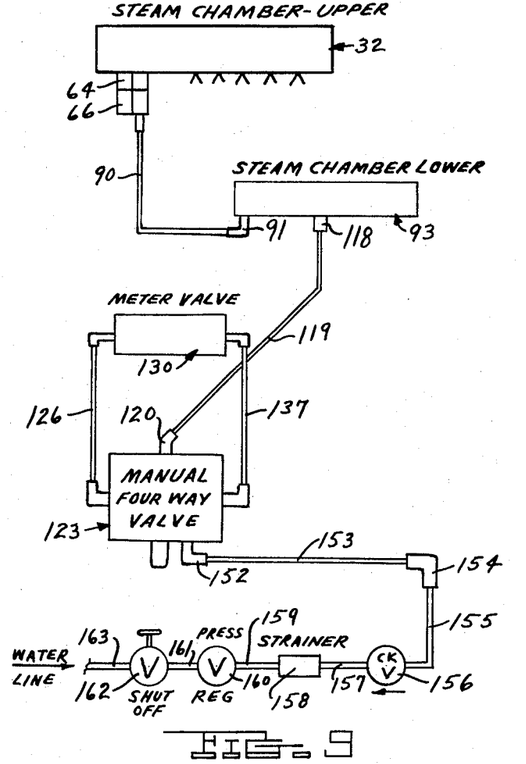
FIG. 9 is a diagrammatic view of the piping circuit employed in the invention.

As illustrated in FIG. 9, one end of a suitable rubber hose 155 is connected to the elbow fitting 154, and the other end of the hose 155 is connected to a reverse check valve 156. A pipe 157 connects the check valve 156 to a suitable strainer 158. The strainer 158 is connected by a pipe 159 to a suitable pressure regulator 160 of the diaphragm type which is set at 20 lbs. per square inch maximum pressure. The pressure regulator 160 insures continuous injection of water into the metering valve 130 and then into the lower steam chamber 93. The pressure regulator 160 is connected by a pipe 161 to a suitable manually operated shut-off valve 162 which is connected by a pipe 163 to a water supply system such as a city water supply system.

As shown in FIG. 5, the valve 123 includes a rotary valve element 164 which is shaped as a disc and made from a suitable non-metallic material such as graphite, carbon or graphite bonded with a suitable plastic. The valve element 164 is rotatably mounted in the cylindrical valve chamber 150 and it is rotated between two operative positions by a rotary valve shaft which is generally indicated by the numeral 165. The shaft 165 is rotatably mounted in the bore 166 and it is provided with an O-ring seal 167. The valve body 147 is provided with a threaded, reduced outer end 168 which is seated in a hole 169 formed through the cabinet front wall 10. The valve disc or element 164 is self-lubricating and forms a seal with the inner face of the valve cover 122 so as to operate without water leakage between these two parts. The non-metallic valve element 164 is not subject to any calcification due to heat emitted by the adjacent heater 98 in the lower steam chest 93. The non-metallic valve element 164 is chemically inert and no calcium deposits will adhere to it, thus resulting in continued trouble-free operation and long life for the valve element 164.

The valve shaft 165 is rotated into each operating position by a valve handle 171 (FIG. 5) which has one end slidably mounted in the bore 172 formed in the outer end the shaft 165. The handle 171 is secured in place by a set screw 173. As shown in FIGS. 5 and 1, a roll pin 174 is pressed into a hole in the shaft 165 and it extends transversely outward therefrom into a 90° arcuate slot 177 formed in the reduced end 168 of the valve body 147. As shown in FIG. 1, the ends of the arcuate slot 177 are marked by the numerals 175 and 176. It will be seen that the roll pin 174 abuts the slot end 175 when the handle 171 is in the operating position shown in FIG. 1, and that when the handle 171 is moved counterclockwise, as viewed in FIG. 1, to the second operating position, the roll pin 174 will abut the end 176 of the rotary slot 177 to limit the movement of the handle 171 and to determine the second operating position of the valve element 164.

As shown in FIG. 5, the valve operating shaft 165 is provided with a round inner end 178 which is rotatably mounted in a round recess 179 formed in the outer face of the valve element 164. The valve shaft 165 also includes an axially extended flat-sided driving member 180 which extends axially inward from the round portion 178 into a driving engagement with a mating slot in the outer face of the valve element 164.

As shown in FIG. 7, the valve element 164 is provided with a pair of diametrically spaced apart, axial passages 181 and 182, which are adapted to be alternately aligned with and to communicate with a pair of mating passages 183 and 184, respectively, in the valve cover 122. As shown in FIG. 5, the passages 183 and 184 communicate with the passages 124 and 138, respectively. As shown in FIGS. 5 and 6, the rotary valve element 164 is also provided with a radially extended slot 185 which has the inner end centrally located between the axial passages 181 and 182, and the outer end extended radially outward so that when one of the passages 181 or 182 communicates with one of the passages 183 or 184 in the valve cover 122, the slot 185 will communicate the other of the passages 183 or 184 with the passage 185.

As shown in FIG. 5, the rotary valve element 164 is normally biased into engagement against the inner face of the valve cover 122 by a suitable spring 186 which has its rear end seated against a bearing washer 187.

In use, the operator would connect the electrical plug 54 to a suitable source of electrical AC power and the hose 155 to the check valve 156. The switch 109 is moved to the "on" position. The apparatus is allowed a few minutes to warm up. After the initial warm-up period, the food to be warmed is placed in the pan 24 and the cover 29 closed. The operator moves the lever 171 from the solid-line position, shown in FIG. 1, in a counterclockwise direction, through an arc of 90° to move it to its second operating position. The rotary valve 164 is thus rotated so as to bring the slot 185 in communication with the passage 183, and the passage 184 is aligned with the passage 182 in the valve disc 164 so as to admit water under pressure into the nipple 137 and into the metering valve 130 to move the piston 139 to the right, as viewed in FIG. 5. It will be understood that the piston 131 would have been in a starting position against the end wall 132 and that the other end of the metering valve is loaded with water. The piston 139 moves to a position against the end wall 129 and forces a predetermined amount of water into the tubing 126 and around to the passages 124 and 183 and to the slot 185. The predetermined charge of water is forced into the tubing 119 and into the lower steam chest 93. The charge of water forced into the lower steam chest 93 is converted into superheated steam in a flash, and this steam exits through the tubing 90 which conveys it through the aforedescribed hinge passages into the upper steam chest 32. The heater 43 in the upper steam chest 32 maintains the high temperature of the steam, and the tapered configuration of the steam chamber 37 conveys the steam downwardly through the discharge ports 38 into warming engagement with the food in the tray 24. The instant food warmer of the present invention is efficient in operation, and it may be used to warm many different kinds of food.

The cabinet and the cover 29 are each preferably insulated with fiberglass and asbestos insulation for a maximum temperature of 400°. The temperature of the steam chambers is maintained at a temperature of approximately 350° F. It will be seen that the lower steam chest 93 also functions to heat the well 20 so as to maintain the food compartment temperature in a range of from 220° to 250° F. The rotary flow valve 123 and the metering valve 130 provide an efficient control for insuring that a predetermined amount of steam is formed in each heating operation. The hinge structure provides a novel and efficient means for conveying the steam to the upper steam chamber 37. The food warmer of the present invention is adapted to operate on low water pressures without requiring any extra pump or water tank.

It will be seen that the pressure regulator 160 in the inlet water line controls the inlet pressure to the four-way valve 123 to insure that a predetermined pressure is applied to the respective intake end of the metering valve 130 so as to provide for a smooth injection of water into the lower steam chest 93, in a turbulence-free manner. The metering valve 130 is adapted to meter a predetermined amount of water than can be fully vaporized in the lower steam chamber 93. By limiting the amount of water injected into the lower steam chamber 93, a complete vaporization takes place with a minimum of heat loss. The heat recovery period for the lower steam chamber 93 is shortened so that the recycling time is also shortened, thereby increasing the productivity of the flash steamer over the prior art designs. The heating element 43 on the upper steam chest 32 maintains the desired temperature in the cover 29 and the steam receiving chamber 37 so as to prevent condensation from forming prematurely and saturating the food in the food compartment 24. The upper heater 43 maintains the steam that is received from the lower steam chest 93 in a superheated state, whereby the steam is discharged through the ports 38 to provide for optimum penetration and heating of the food in the food compartment 24. The tapered, heated upper steam chest 37 maintains the proper pressure and temperature of the steam.

The disposition of the steam discharge means over the food tray 24 prevents the accumulation of sediment in the steam discharge ports 38. Any sediment is collected in the well 20, and such sediment will have no injurious effect on the operation of the food warmer.

FIG. 10 illustrates a second embodiment of a metering valve employed in the invention. The parts of the metering valve embodiment of FIG. 10 which are similar to the parts of the metering valve illustrated in FIG. 5 are marked by the same reference numerals followed by the small letter *a*. The metering valve of FIG. 10 includes a cylindrical valve body 131a which is made from brass tubing. The ends of the cylindrical valve body 131a are seated in the circular grooves 188 and 189 formed in the inner sides of the end plates 129a and 132a. The valve body 131a is provided with the chamfers 190 and 191 on the ends of the inner diameter or chamber, and mounted between these chamfers and the inner diameter of the grooves 188 and 189 are a pair of suitable O-ring seals 192 and 193, respectively.

The end plates 129a and 132a are secured together by a plurality of elongated machine screws 194 which are slidably extended through bores 195 in the end plate 129a and threadably engaged in bores 196 in the end plate 132a. Slidably mounted in the valve chamber in the valve body 131a is a brass valve piston 139a. The piston 139a is provided with a pair of parallel grooves 197 and 198, in each of which is operatively mounted a suitable seal as 199 and 200, respectively.

It will be understood that the modified metering valve of FIG. 10 operates in the same manner as the metering valve 130 of FIG. 5, for feeding predetermined amounts of water into the lower steam generating chest 93.

While it will be apparent that the preferred embodiment of the invention herein disclosed is well calculated to fulfill the objects above stated, it will be appreciated that the invention is susceptible to modification, variation and change.

What I claim is:

1. In a flash steamer for heating articles, the combination comprising:
   (a) a cabinet having a compartment for the reception of articles to be heated;
   (b) a cover;
   (c) hinge means for swingably mounting said cover on said cabinet for covering said compartment during a heating operation;
   (d) a steam generating chest mounted within said cabinet in heating engagement with said compartment, and including a steam generating chamber;
   (e) means carried in said steam generating chest for heating said steam generating chamber;
   (f) a steam receiving and discharging chest in said cover for receiving stream generated in said steam generating chamber and discharging it into said compartment;

(g) said steam receiving and discharging chest including a chamber formed with a plurality of discharge ports, and a tapered cross section to distribute the steam entering the chamber evenly downwardly through the discharge ports into said compartment;

(h) heating means in said cover for heating said steam receiving and discharging chamber;

(i) steam passage means, including passage means for conveying steam generated in said steam generating chamber upwardly into said cover and into the larger end of the tapered steam receiving and discharging chamber;

(j) a water metering valve mounted in said cabinet;

(k) a four-way rotary flow control valve mounted in said cabinet and connected to a water supply source; and (l) water conduit means for operatively connecting said metering valve to said rotary flow control valve, and said rotary flow control valve to said steam generating chamber, whereby when said flow control valve is moved from one operating position to another operating position a predetermined amount of water will be conducted into said steam generating chamber for generating a charge of steam for passage through said steam passage means into said steam receiving and discharging chamber from where it is discharged evenly downward into said compartment.

2. A flash steamer as defined in claim 1, wherein said water metering valve includes:

(a) an elongated body having a valve chamber open at the ends thereof;

(b) a pair of end plates enclosing the open ends of said elongated body;

(c) an opening formed through each of said end plates;

(d) a valve piston slidably mounted in said body;

(e) a valve seal means mounted on each end of said piston for sealing engagement around the opening in the adjacent end plate when the valve piston is moved against the adjacent end plate by pressurized water admitted into the valve body through the opening in the other end plate; and, (f) said conduit means including a first conduit having one end connected to the opening in one of the end plates and the other end connected to said flow control valve, and a second conduit having one end connected to the opening in the other end plate and the other end connected to said flow control valve.

3. A flash steamer as defined in claim 2, wherein:

(a) said valve piston is provided with a plurality of annular grooves formed around the periphery thereof.

4. A flash steamer as defined in claim 2, wherein said flow control valve includes:

(a) a body member having a water supply chamber connected to a source of water;

(b) said water supply chamber having an open end enclosed by a cover which is provided with a pair of passages communicating with said supply chamber;

(c) the other end of said first conduit being connected to one of the passages in said cover, and the other end of said second conduit being connected to the other of the pasages in said cover;

(d) said cover being provided with a third passage having one end communicating with said water supply chamber;

(e) said conduit means including a third conduit having one end connected to the other end of said third passage and the other end connected to said steam generating chamber; and, (f) a rotatable valve element operatively mounted in said water supply chamber and adapted to control the flow of water from said supply chamber into said metering valve and thence into said steam generating chamber.

5. A flash steamer as defined in claim 4, wherein:

(a) said pair of passages and said third passage in the flow control valve cover terminate at the supply chamber in a common flat valve seat on the valve cover; and, (b) said rotatable valve element comprises a non-metallic disc having a flat valve face in sliding rotary engagement with said flat valve seat, and a plurality of passages formed therein for selectively connecting the supply chamber to the metering valve and the metering valve to said steam generating chamber.

6. A flash steamer as defined in claim 5, wherein said flow control valve includes:

(a) a shaft rotatably mounted in said body member and drivably connected to said rotatable valve disc for rotating it between said operating positions.

7. A flash steamer as defined in claim 6, including:

(a) means for biasing said rotatable valve disc against said flat valve seat.

8. A flash steamer as defined in claim 6, including:

(a) means for limiting the rotation of said shaft between said operating positions.

9. A flash steamer as defined in claim 1, wherein said hinge means includes:

(a) a first hinge member carried by said cabinet;

(b) a second hinge member attached to said steam receiving and discharging chest in said cover;

(c) a hinge pin hingedly connecting said first and second hinge member;

(d) one end of said hinge pin being fixed in one of said hinge members and the other end of said hinge pin being rotatably mounted in the other of said hinge members;

(e) seal means in said other said hinge members engaging said hinge pin for sealing engagement against the end face of the hinge pin; and, (f) said steam passage means through said hinge means being extended through said hinge members, hinge pin and seal means.

10. A flash steamer as defined in claim 9, wherein:

(a) said seal means comprises a non-metallic annular member having one face in sliding rotatable engagement with the end face of the hinge pin in said other of said hinge members.

11. A flash steamer as defined in claim 10, wherein:

(a) said annular member is provided with a circumferential sealing means.

12. A flash steamer as defined in claim 11, including:

(a) means for biasing the annular member against said hinge pin.

13. A flash steamer as defined in claim 1, wherein said water metering valve includes:

(a) an elongated body having a valve chamber open at the ends thereof;

(b) a pair of end plates enclosing the open ends of said elognated body;

(c) an opening formed through each of said end plates;

(d) a valve piston slidably mounted in said body for selective movement against said end plates to alternately force water from the opposite ends of the valve chamber through the openings in the end plates;

(e) sealing means on said piston; and, (f) said conduit means including a first conduit having one end connected to the opening in one of the end plates and the other end connected to said flow control valve, and a second conduit having one end connected to the opening in the other end plate and the other end connected to said flow control valve.

14. A flash steamer as defined in claim 13, wherein:

(a) said sealing means is mounted around the periphery of said piston for sealing engagement with the inner surface of said valve chamber.

15. A flash steamer as defined in claim 13, wherein:
(a) said sealing means comprises a seal member on each end of the valve piston.

References Cited

UNITED STATES PATENTS

| | | | |
|---|---|---|---|
| 2,181,434 | 11/1939 | Lewis et al. | 126—369 XR |
| 2,719,211 | 9/1955 | Lewis et al. | 126—369 |
| 2,980,099 | 4/1961 | Klemm | 126—20 |
| 3,069,994 | 12/1962 | Lewis | 126—369 XR |

DONLEY J. STOCKING, Primary Examiner

ROBERT A. DUA, Assistant Examiner

U.S. Cl. X.R.

99—234; 219—401

PO-1050
(5/69)

UNITED STATES PATENT OFFICE
CERTIFICATE OF CORRECTION

Patent No. 3,500,818          Dated March 17, 1970

Inventor(s) ALBERT M. ELIAS

It is certified that error appears in the above-identified patent and that said Letters Patent are hereby corrected as shown below:

Column 1, line 60, after "art" insert -- are --. Column 1, line 60, change "2,186-" to -- 2,786- --. Column 3, line 7, "elevation" should be -- elevational --. Column 3, line 27, "materials" should be -- material --. Column 4, line 48, after "loss" insert -- of --. Column 7, line 32, "connetced" should be -- connected --. Claim 1, element (f) column 10, line 75, change "stream" to -- steam --. Claim 1, element (g), column 11, line 6, change "downwardly" to -- downward --. Claim 1, element (l), column 11, line 10, after "means" insert -- through said hinge means --.

SIGNED AND
SEALED
JUL 28 1970

(SEAL)
Attest:

Edward M. Fletcher, Jr.
Attesting Officer

WILLIAM E. SCHUYLER, JR.
Commissioner of Patents